E. KATZINGER.
ELECTRIC WELDING PROCESS.
APPLICATION FILED MAY 9, 1910.
1,064,338.
Patented June 10, 1913.
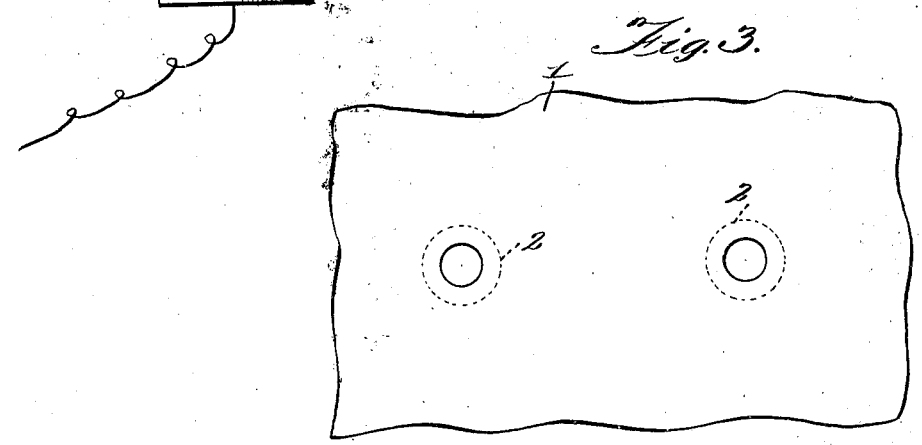
Inventor:
Edward Katzinger

UNITED STATES PATENT OFFICE.

EDWARD KATZINGER, OF CHICAGO, ILLINOIS.

ELECTRIC WELDING PROCESS.

1,064,338. Specification of Letters Patent. Patented June 10, 1913.

Application filed May 9, 1910. Serial No. 560,101.

*To all whom it may concern:*

Be it known that I, EDWARD KATZINGER, a citizen of the United States, residing at Chicago, in the county of Cook and State of Illinois, have invented certain new and useful Improvements in Electric Welding Processes, of which the following is a specification.

This invention relates to processes of welding by electric currents, and has for its primary object to provide an improved spot welding process by means of which two pieces of sheet metal can be easily, rapidly and effectively united.

One of the objects is to provide an improved electric spot welding process for uniting two pieces of sheet metal which shall be peculiarly serviceable in welding a relatively heavy sheet or strap to a thinner one.

Other and further objects will appear in the specification and be more specifically pointed out in the appended claims, reference being had to the accompanying drawings exemplifying the invention.

In the drawings—Figure 1 is an elevation, parts being shown in section, of a pair of coöperating dies by means of which a piece of sheet metal may be provided with protuberances according to the present invention. Fig. 2 is a view in elevation of two sheets superimposed one upon the other, one of said sheets being provided with flattened protuberances constructed in accordance with the principles of this invention. Fig. 3 is a top plan view of the upper sheet shown in Fig. 2. Fig. 4 is a view in elevation of coöperating electrodes with welded sheets therebetween, shown in section.

In well known processes of spot welding, it is customary in welding together a relatively thick sheet and a relatively thin sheet, to provide pointed protuberances on the thicker sheet, and after the thinner sheet has been placed in contact with the points of said protuberances, to make the welds under pressure between oppositely disposed electrodes. In these processes, not only are the welds frequently imperfect, due to the concentration of too large current on a small portion of the thinner sheet, with the consequent burning of the same, but the point of protuberance on the heavier sheet tends to indent, and at times passes entirely through the thinner sheet, so that a soft metal electrode pressed against the thinner sheet commonly becomes disfigured by indentations or cavities to such an extent that its serviceability becomes impaired. To avoid these difficulties is one of the objects of this invention.

According to the present invention, one of the sheets 1 which is the heavier one when they are of different thickness is provided with a flattened protuberance or projection 2, which is preferably of uniform cross section throughout, and has a facet 3 formed on the outer end to adapt it to have a comparatively broad welding contact with a second or thinner sheet 4, as shown in Fig. 2. An efficient means for forming the protuberances 2 with flattened end faces 3 consists of coöperating dies 5 and 6, one of said dies being provided with a protuberance 7 and the other of said dies being provided with a weld or socket 8. The relative proportions of said protuberances and socket are such as to form the protuberances 2 when the dies 5 and 6 are brought together with the sheet 1 interposed.

According to Figs. 2 and 3, the sheet 1 is provided with a plurality of protuberances 2, 2, adapting the sheets to be welded together at these points. In Fig. 4, which illustrates the final step of the process, a pair of coöperating electrodes 9, 10 are shown in positions above and below the sheets 1 and 2, which positions they occupy after being pressed together on opposite sides of said sheets to effect the weld during the passage of a welding current. The welded portion is indicated in this figure by a vertical cross hatching.

By an inspection of Fig. 4, it will be noted that the electrode 10 which bears against the thinner sheet 4 is made considerably larger in cross section than the cross sectional area of the weld between the two sheets. By this means, the welding current as it passes into the thinner sheet is diffused radially in all directions so that without impairing the weld, the possibility of burning the thinner sheet 4 is reduced to a minimum.

What I claim is—

1. The process of electrically welding two sheets of metal which consists in stamping one of said sheets between coöperating dies to form a plurality of uniform projecting portions with equal flat end facets, in applying said facets to the other sheet and in passing a welding current through said sheets and projections while pressing the sheets together.

2. The process of welding together two metal sheets, which consists in providing one of said sheets with protuberances having each the same cross-section throughout and equal flat end facets, in pressing the other sheet against said end facets, and finally in passing a welding current from one sheet to the other through said protuberances.

3. The process of welding together two metal sheets of different thicknesses which consists in providing the thicker sheet with equal flattened projections having substantially the same cross-sectional area, in pressing the thinner sheet against the flat surfaces of said projections, and finally in passing a welding current from one sheet to the other through said projections.

4. The process of welding together two sheets of different thicknesses which consists in providing the thicker sheet with flattened protuberances all having substantially the same cross-sectional area, in applying the thinner sheet to the flattened protuberances, and in pressing said sheets together between electrodes while passing a welding current through said electrodes and sheets, the electrode bearing against the thinner sheet being of relatively large area in comparison to the protuberance to diffuse the current through the thinner sheet around said protuberance.

5. The process of electrically spot welding metal sheets of different thicknesses which consists in forming the thicker sheets with projections of equal cross section, each having a flattened end, in placing the sheets one against the other with said projections spacing them apart, and in pressing the sheets together between electrodes while passing a welding current through said electrodes and sheets, the electrode bearing against the thinner sheet being of relatively large area in comparison to the cross-sectional area of the protuberance to equalize the current density of the welding current through the thinner sheet around the protuberance.

6. The process of welding together two metal sheets of different thicknesses which consists in forming the thicker sheet with projections having substantially the same cross-sectional area and flattened tops of equal area, in pressing the metal sheets together between electrodes having a larger area than the cross-sectional area of the projections, and in passing a welding current through said electrodes and sheets.

In testimony whereof I have signed my name to this specification, in the presence of two subscribing witnesses, on this 2nd day of May A. D. 1910.

EDWARD KATZINGER.

Witnesses:
M. W. CANTWELL,
A. O. KNIGHT.